United States Patent
Huege

(10) Patent No.: US 7,326,400 B2
(45) Date of Patent: Feb. 5, 2008

(54) TREATMENT OF HIGH SULFATE CONTAINING QUICKLIME

(75) Inventor: Fred R. Huege, Colleyville, TX (US)

(73) Assignee: Chemical Lime Company, Fort Worth, TX (US)

(*) Notice: Subject to any disclaimer, the term of this patent is extended or adjusted under 35 U.S.C. 154(b) by 0 days.

(21) Appl. No.: 11/460,097

(22) Filed: Jul. 26, 2006

(65) Prior Publication Data

US 2007/0036702 A1 Feb. 15, 2007

Related U.S. Application Data

(63) Continuation-in-part of application No. 11/203,017, filed on Aug. 11, 2005, now abandoned.

(51) Int. Cl.
*C01F 11/00* (2006.01)
(52) U.S. Cl. ............... 423/637; 423/640; 423/158
(58) Field of Classification Search ............... 423/158, 423/637, 640, 518
See application file for complete search history.

(56) References Cited

U.S. PATENT DOCUMENTS

| 4,464,353 | A | | 8/1984 | Hains ................. 423/640 |
| 4,866,019 | A | * | 9/1989 | van Broekhoven ........ 502/65 |
| 5,228,808 | A | * | 7/1993 | McKennon et al. ....... 405/263 |
| 5,334,564 | A | | 8/1994 | Pinnavaia et al. .......... 502/84 |
| 5,547,588 | A | * | 8/1996 | Hassett et al. ............. 210/724 |
| 2003/0160003 | A1 | * | 8/2003 | Maree .................... 210/724 |

* cited by examiner

*Primary Examiner*—Ngoc-Yen Nguyen
(74) *Attorney, Agent, or Firm*—Charles D. Gunter, Jr.

(57) ABSTRACT

A method is shown for controlling the presence of soluble sulfate ions in a lime slaking operation in which a source of quicklime is combined with slaking water to form calcium hydroxide product. A complexing agent is added to either the quicklime or the slaking water which is effective to tie up the soluble sulfate ions otherwise available in solution, whereby the agglomeration of calcium hydroxide product is acceptably controlled.

10 Claims, 2 Drawing Sheets

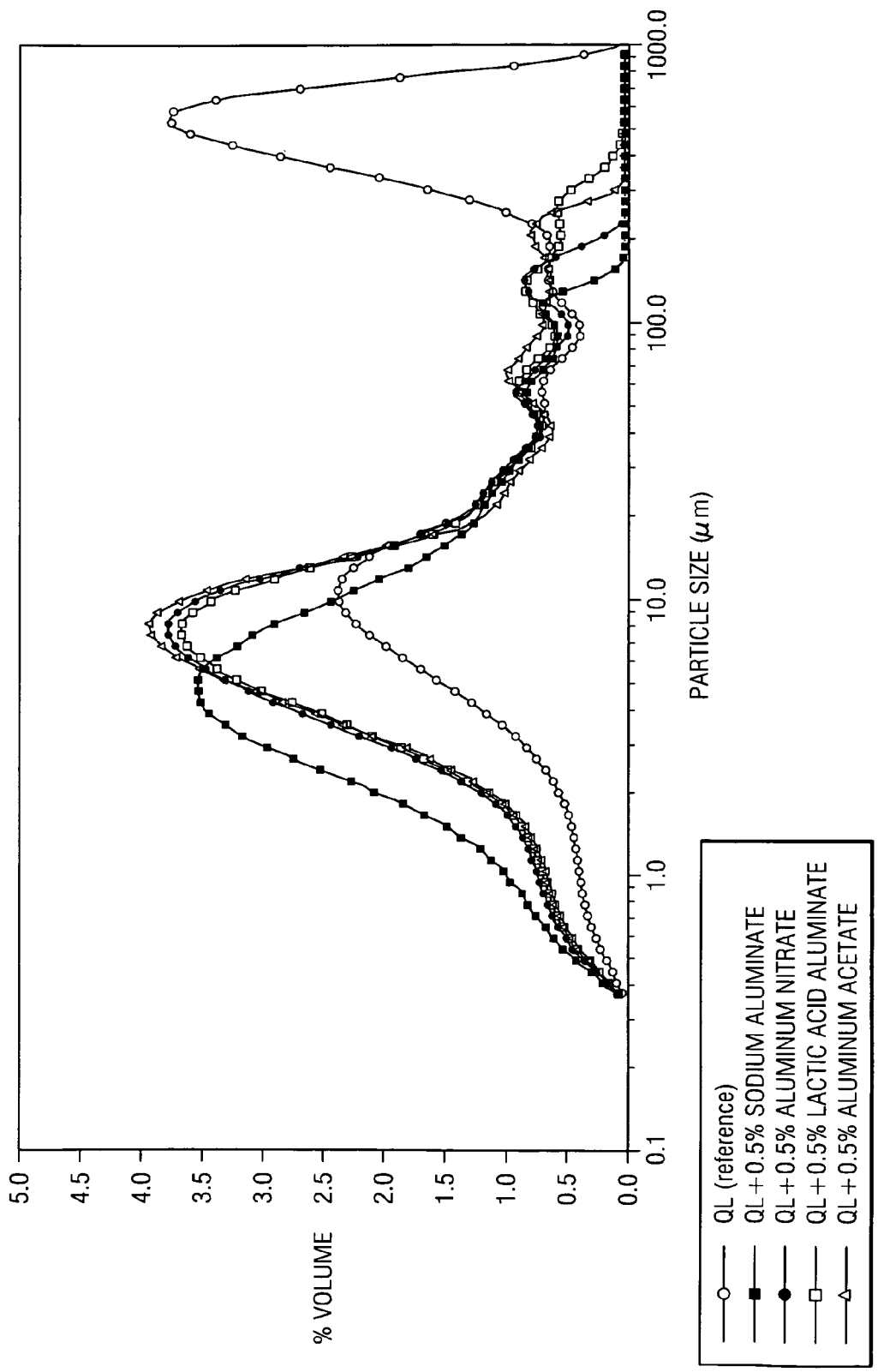

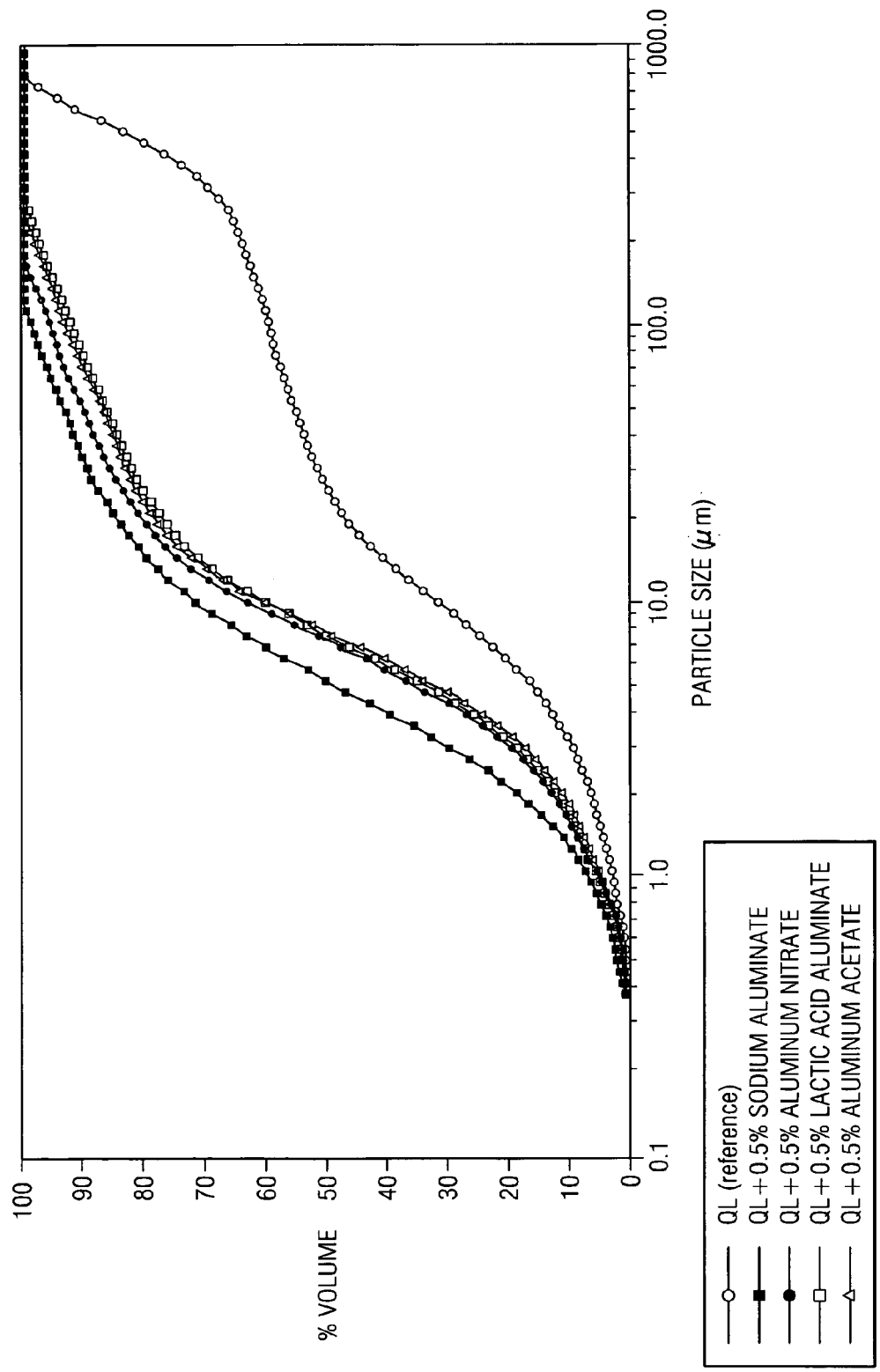

TREATMENT OF HIGH SULFATE CONTAINING QUICKLIME

CROSS REFERENCE TO RELATED APPLICATION

This application is a continuation-in-part of Ser. No. 11/203,017, filed Aug. 11, 2005 now abandoned, entitled "Treatment of High Sulfate Containing Quicklime," by inventor, Fred R. Huege.

BACKGROUND OF THE INVENTION

1. Field of the Invention

The present invention relates to the production of commercial quicklime and its end products and specifically to a process for controlling the presence of soluble sulfate ions during the slaking of quicklime which would otherwise lead to undesirable agglomeration of the fine calcium hydroxide particles produced.

2. Description of the Prior Art

Lime, in its different forms, has a variety of uses. It is commonly used in treating waste water and sewage. It is used in agriculture to neutralize acidic soils and to provide nutrients for sustaining plant life. Lime is also used extensively in construction for the stabilization of soils and as a component in a variety of building materials. These are but a few of the many uses of this versatile material.

The general term "lime" is often used interchangeably to mean both quicklime (calcium oxide) and hydrated lime (calcium hydroxide). Quicklime is produced by heating limestone (calcium carbonate) in a kiln at extreme temperatures to "calcine" the material and thereby drive off carbon dioxide. Quicklime is usually in the form of lumps or pebbles. In order to further process lime and improve the ease with which it is handled, quicklime is often contacted or mixed with water. The water reacts with the quicklime in an exothermic reaction to form hydrated lime. This is often referred to as "slaking." During the slaking of quicklime, large amounts of heat are given off which can significantly raise the temperature of the slurry. Water can then be driven off to produce dry, hydrated lime which is usually a powder. Technically, the terms "hydration" and "slaking" are synonymous and interchangeable. However, according to popular usage of these terms, hydration yields a dry powdered hydrate, whereas slaking involves more water, producing wet hydrates, sometimes referred to as putties, slurries, milk of lime and lime water, depending upon the amount of excess water they contain.

It is well established that sulfur in the form of sulfates is a undesired impurity in commercial quicklime. For example, the sulfur is detrimental for the use of quicklime in the steel industry because one of its applications is to remove sulfur during the flux operation of purifying iron into steel. The presence of sulfur in any form is detrimental in this market.

In other markets where quicklime is slaked to produce a milk of lime or lime slurry, the presence of sulfate ions in the quicklime causes an agglomeration reaction during the slaking process which causes the fine particles of calcium hydroxide to stick together and thus settle out of suspension.

In some instances in the past, sulfate ions have actually been intentionally introduced into the lime slaking operation. For example, well-established technology exists which involves the addition of gypsum or sulfate ions to quicklime during the slaking operation to increase the solids content of lime slurry in a controlled manner. U.S. Pat. No. 4,464,353, issued Aug. 7, 1984, to Norman L. Hains teaches that, in the production of a lime slurry, the timely addition of sulfate compounds, preferably calcium sulfate, to the aqueous slaking medium prior to the introduction of calcium oxide (quicklime) retards the chemical reaction of the calcium oxide with the aqueous slaking medium, thereby forming a lime slurry having decreased solubility and increased particle agglomeration. According to the teaching of that patent, the described process affects the physical properties of the lime slurry formed by allowing the formation of larger crystals of calcium hydroxide, thus increasing the average particle size by agglomeration.

Despite the advantages obtained through the addition of sulfate ions during the slaking operation under the controlled conditions described above, it is known that the presence of excess sulfate ions will cause an unstable lime slurry which will settle out in storage tanks and in transport vehicles.

In many instances, it is therefore desirable to limit the presence or availability of free sulfate ions during the quicklime slaking operation.

An opposing consideration for the lime manufacturer, however, is the fact that there is an advantage in the production of quicklime to increase the sulfur content in the product. This results from the fact that the higher sulfur content fuels used in the step of calcining the limestone to form quicklime are less expensive then lower sulfur content fuels. Thus, the manufacturers of quicklime would like to use as high a sulfur fuel as possible, balancing the sulfur content in the quicklime and operational conditions in the kiln.

The quality and type of fuel exert a dramatic effect on the quality of lime produced. The major fuel sources at the present time include solid fuels, such as bituminous coal, anthracite coal, coke and producer gas, natural gas and fuel oil. While sulfur exists in limestone homogeneously as calcium sulfate or heterogeneously in the mineral pyrite in amounts of about 0.01 to 0.12%, the calcining fuel generally introduces more sulfur into the calcination process than does the limestone feed, natural gases being the exception. For example, coal used for lime manufacture typically contains 0.5-3.5% and fuel oils contain nearly as much.

There exists a need, therefore, for a process which would allow the use of higher sulfur content fuels in the step of calcining the limestone to form quicklime which would, at the same time, control the presence of soluble sulfate ions during the slaking of quicklime which would otherwise lead to undesirable agglomeration of the calcium hydroxide particles produced.

A need also exists for such a process which would allow the use of solid fuel sources in the calciner, such as coal, rather than requiring the use of more expensive natural gas as a fuel source.

A need exists for such a process which would be easily implemented as a part of the slaking operation without requiring drastic changes in operational procedures or equipment.

SUMMARY OF THE INVENTION

It is therefore an object of the present invention to provide a treatment method for high sulfate containing quicklimes which allows the use of typical solid fuels to fuel the calciner, rather than requiring the use of more expensive natural gas as a calciner fuel, and yet which controls the presence of soluble sulfates during the slaking operation.

The presence of soluble sulfate ions during the slaking of quicklime causes an undesirable agglomeration of the fine calcium hydroxide particles by an unknown mechanism.

The higher the sulfur/sulfate concentration in the quicklime the more dramatic the agglomeration of the calcium hydroxide particles and the lower the commercial value of the quicklime and the more limited its market.

It has been discovered that the sulfate ions can be de-activated and thus controlled during the slaking operation through the mechanism of the present invention. As a result, they do not cause the undesirable agglomeration of the calcium hydroxide particles discussed above. This de-activation is achieved by having the sulfate ions precipitated or complexed prior to the onset of the quicklime slaking reaction. Once precipitated or "tied up" the soluble sulfate ions no longer enter into the slaking reaction even if they are still present during slaking.

Preferably, the soluble sulfate ions are tied up by artificially inducing the formation of an additional reaction product, complex or precipitant, during the slaking operation, for example, ettringite or the like. Ettringite, a complex mineral composed of calcium alumina sulfate, $Ca_6Al_2(SO_4)_3(OH)_{12}.26(H_2O)$, forms under alkaline conditions with the proper concentrations of calcium, aluminum and sulfate ions being present. The presence of aluminum ions can be achieved by the addition of an aluminum ion donor composition, such as sodium aluminate. The sodium aluminate can be added to the slaking water or to the quicklime. Preferably, it is first dissolved in the slaking water prior to adding the quicklime.

In its most preferred aspect, the present invention is therefore a method of slaking high sulfate containing quicklime to form fine particles of calcium hydroxide. The method first involves the step of providing a source of quicklime and a source of slaking water. Next, a complexing agent is mixed with the quicklime or with the slaking water, the complexing agent being effective to complex with and tie up available soluble sulfate ions present in the quicklime upon addition of the quicklime to the slaking water. As a result, the undesirable agglomeration of fine particles of calcium hydroxide is prevented.

Additional objects, features and advantages will be apparent in the written description which follows.

BRIEF DESCRIPTION OF THE DRAWINGS

FIG. 1 is a graph of particle size distribution of lime milk based on high-sulfur quicklime (QL reference) compared with lime milk according to the present invention prepared from the same QL but with various additions.

FIG. 2 is a graph of cumulative particle size of lime milk based on high-sulfur quicklime (QL reference) compared with lime milk prepared according to the present invention from the same QL but with various additions.

DETAILED DESCRIPTION OF THE INVENTION

In the discussion which follows, the term "quicklime" will be taken to mean calcium oxide and should not be confused with limestone (calcium carbonate). As briefly outlined in Applicant's background discussion, quicklime is manufactured from limestone by heating to remove carbon dioxide. Quicklime can be converted to $Ca(OH)_2$ by a slaking process where water and CaO are mixed under agitation to produce $Ca(OH)_2$, known in the industry as slaked lime or lime hydrate.

In the typical prior art process for producing industrial grade hydrated lime, raw limestone is first fed to a calciner which is typically a horizontal or vertical kiln. The kiln is fired by burners which typically utilize pulverized coal as a fuel and are capable of reaching calcining temperatures in excess of 1600° F. The intense heat causes a chemical reaction as follows:

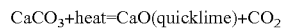
$CaCO_3 + heat = CaO(quicklime) + CO_2$

The quicklime produced in the calciner is then slaked by mixing with an aqueous slaking medium in hydrator. This results in an exothermic reaction generating heat and calcium hydroxide:

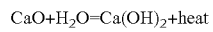
$CaO + H_2O = Ca(OH)_2 + heat$

The size and quality of slaked lime particles in the resulting slurry are dependent on a number of variables. These include the reactivity, particle size and gradation of the quicklime used. Other variables include the amount of water used, the quality of the water, and the amount and type of water impurities. Further, the temperature of the water and the amount of agitation can affect slaked lime quality and particle size.

The presence of sulfur in the quicklime, particularly in the form of soluble sulfate ions is undesirable. As discussed in the Background section above, it has been discovered that the undesirable sulfate ions can be de-activated and thus controlled during the slaking operation through the mechanism of the present invention, thus not causing the undesirable agglomeration of the calcium hydroxide particles. This de-activation is achieved by having the sulfate ions precipitated, complexed, reacted or otherwise interacted in a specific predetermined fashion prior to the onset of the quicklime slaking reaction. In the present discussion, the various mechanisms of "complexing," "reacting" or "precipitating" may all be referred to collectively by the team "complexing" for simplicity. By whatever mechanism, once precipitated, complexed or "tied up" the soluble sulfate ions no longer enter into the slaking reaction even if they are still present during the slaking reaction. In other words, the act of complexing the soluble sulfate ions hinders their ability to compete in the slaking reaction with the other free ions present. In using the term "sulfate" Applicant intends in this discussion to encompass sulfur in whatever form it may be present in the quicklime being slaked. Most commonly, this will be in the form of soluble sulfate ions.

The solubility of sulfate salts varies significantly depending upon the cation present. As shown below, most sulfate salts are soluble with the exception of barium sulfate, which has a very low solubility.

| | Sulfate Solubility | |
|---|---|---|
| Cation | KSP | gm/100 gm water |
| Calcium | 2.0E-04 | 0.2 |
| Strontium | 3.8E-07 | 0.01 |
| Barium | 1.1E-10 | 0.0002 |
| Lead | 1.0E-08 | 0.004 |
| Ettringite* | | 0.0001 |

*Estimated sulfate solubility

The test results which are reported in the discussion which follows show the effectiveness of barium in removing the sulfate ions which would otherwise have a detrimental effect on the slaking reaction. Unfortunately barium is considered a heavy metal with certain health and environmental limitations. Thus while the use of barium may be a technical solution, it is not seen as being a commercially viable option. Strontium is a more benign chemical, but is has higher sulfate ion solubility compared to barium. Thus it is less effective in decreasing the detrimental sulfate agglomeration.

Applicant's preferred solution for complexing the soluble sulfate ions is to create conditions conducive to the formation of a complex such as the mineral ettringite, or the like. Ettringite is a complex mineral composed of calcium alumina sulfate, $Ca_6Al_2(SO_4)_3(OH)_{12}\cdot26(H_2O)$. Ettringite is very insoluble in water once it is formed. Ettringite does not contain any heavy metals or toxic elements. If ettringite is formed under the conditions present during the slaking of quicklime it will complex the sulfate ions, thus reducing their agglomeration effect on the calcium hydroxide particles.

Ettringite forms under alkaline conditions with the proper concentrations of calcium, aluminum, and sulfate ions being present. The data contained in the Tables which follow shows the effectiveness of adding sodium aluminate to complex the soluble sulfates ions in a slaking operation, thus preventing calcium hydroxide particle agglomeration. Initially calcium chloride was also added with the sodium aluminate to have a soluble source of calcium ions immediately available for the ettringite formation, but it was later shown not to be necessary in that the slaking calcium oxide provided the necessary calcium ions for the ettringite formation. The sodium aluminate can be added to the slaking water or to the quicklime, although it appears to be more effective when first dissolved in the slaking water prior to adding the quicklime.

It will be appreciated that, rather than attempting to de-agglomerate the calcium hydroxide particles after the slaking reaction, Applicant proposes to prevent the agglomeration from occurring in the first place by removing (complexing) the offending sulfate ions, thus preventing undesirable agglomeration during the quicklime slaking reaction. To test the validity of the complexing hypothesis, initial tests were run with the addition of barium ions into the slaking reaction to form the insoluble barium sulfate precipitate. As discussed above, the use of barium ions is unlikely to be a commercially acceptable additive, but it is an appropriate material for concept evaluation.

The results in Table 1 below show a dramatic decrease in +100 mesh (150 micron) residue with the addition of barium ions to precipitate the soluble sulfate ions. In addition to reducing the agglomeration, the precipitation of the soluble sulfate ions also decreased the average particle size and increased the viscosity of the slaked lime slurry. In these tests, and the tests which follow, gypsum was added to the quicklime slaking water to simulate the addition of sulfate ions from a high sulfur fuel.

TABLE 1

| Screen | Control, 100 gm QL slaked with 277 gm of DI water | 100 gm of QL + 0.5% gypsum added to QL, slaked with 277 gm DI water | 100 gm of QL + 1.0% gypsum added to QL, slaked with 277 gm DI water | 100 gm of QL + 0.5% gypsum added to QL, slaked with 277 gm DI water with 1.0 gn of barium hydroxide added to the water | 100 gm of QL + 1.0% gypsum added to QL, slaked with 277 gm DI water with 2.0 gn of barium hydroxide added to the water |
|---|---|---|---|---|---|
| | | | Amount Retain on screen grams | | |
| 20 mesh (0.85 mm) | 1.67 | 1.12 | 2.49 | 0.55 | 1.10 |
| 40 mesh (0.425 mm) | 0.82 | 1.72 | 4.32 | 1.54 | 0.90 |
| 100 mesh (150 microns) | 4.14 | 12.55 | 20.56 | 4.57 | 2.45 |
| Particle Size Distribution* | | | | | |
| Median Diam, μm | 2.93 | 4.23 | 6.36 | 1.71 | 1.85 |
| Modal Diam, μm | 2.40 | 2.40 | 22.26 | 1.06 | 0.99 |

*FW Lab-dried slurry from 100 pass sieve

To further validate the technology and determine commercial viability, additional tests were performed, the results of which are given in Table 2 below. These results show that it was in fact the barium precipitation of the sulfate ions which achieved the desired result and not a pH effect caused by the barium hydroxide. Commercially important is the fact that the solid sulfate ion precipitation material can be added directly to the quicklime and still be effective.

TABLE 2

| Screen | 100 gm of QL + 1.0% gypsum added to QL, slaked with 277 gm of DI water with 2.0 gm of barium hydroxide added to the water, the water was then neutralized with HCl to ph = 7 | 100 gm of QL + 1.0% gypsum added to QL, slaked with 277 gm DI water with 1.0 gm of sodium hydroxide added to the water | 100 gm of QL + 1.0% gypsum and 1.0 gm barium hydroxide added to QL, slaked with 277 gm DI water |
|---|---|---|---|
| 20 mesh (0.85 mm) | 0.12 | 1.18 | 0.49 |
| 40 mesh (0.425 mm) | 0.34 | 1.96 | 0.70 |
| 100 mesh (150 microns) | 2.57 | 14.13 | 4.71 |

TABLE 2-continued

| Screen | 100 gm of QL + 1.0% gypsum added to QL, slaked with 277 gm of DI water with 2.0 gm of barium hydroxide added to the water, the water was then neutralized with HCl to ph = 7 | 100 gm of QL + 1.0% gypsum added to QL, slaked with 277 gm DI water with 1.0 gm of sodium hydroxide added to the water | 100 gm of QL + 1.0% gypsum and 1.0 gm barium hydroxide added to QL, slaked with 277 gm DI water |
|---|---|---|---|
| Particle Size Dist.* | | | |
| Median Diam, μm | 2.46 | 6.01 | 2.80 |
| Modal Diam, μm | 1.37 | 23.96 | 1.96 |

*FW Lab-dried slurry from 100 pass sieve

Tables 3 and 4 which follow show additional test results which were obtained and which compare the use of sodium aluminate as an ettringite "promoter" with the addition of barium and strontium. The laboratory tests were run utilizing deionized water and 100 grams of quicklime obtained from a commercial lime kiln. The test results compare the addition of the above reactants both to the slaking water and, in some cases, after slaking. The addition of sodium aluminate can be seen to be effective as a complexing agent in removing the undesirable soluble sulfate ions from the reaction.

Although the tests shown in Tables 3 and 4 all use sodium aluminate as the ettringite promontory, it will be appreciated by those skilled in the art that other alumina donors could be utilized as well, for example, aluminum nitrate ($Al[NO_3]_3$), aluminum acetate ($C_4H_7AlO_5$) and L-lactic acid aluminum salt ($C_9H_{15}AlO_2$). The primary criteria for a candidate material is that it provide a supply of free alumina ions in aqueous solution.

Table 5 which follows as well as FIGS. 1 and 2 of the drawings, compare the effect of sodium aluminate as well as other aluminum ion donor when 150 g of a quicklime containing 0.4% by weight of sulfur is slaked in 600 g of water, without or with 0.5% additive by weight (0.75 g in 150 g of quicklime). The effect of all the additives on reducing the particle size distribution and the settling of the corresponding milk of lime appears clearly compared to the reference (control) without any additive.

TABLE 3

| Date | | | | May 27, 2005 | | | |
|---|---|---|---|---|---|---|---|
| | 12 | 15 | 14 | 7 | 8 | 9 | 13 |
| Description | 300 g DI H₂O + [100 g QL + 2 g Gypsum + 4 g Al₂O₃ Na₂O] | 301 g DI H₂O + [100 g QL + 5 g Gypsum] | 300 g DI H₂O + [100 g QL + 2 g Gypsum] | [300 g DI H₂O + 1 g Ba(OH)₂] + [100 g QL + 1 g Gypsum] | [300 g DI H₂O + 2 g Sr(NO₃)₂] + [100 g QL + 1 g Gypsum] | [300 g DI H₂O + 2 g Ba(OH)₂] + [100 g QL + 1 g Gypsum] | [300 g DI H₂O + 4 g Sr(NO₃)₂] + [100 g QL + 1 g Gypsum] |
| Gypsum Additive | 2 gm | 5 gm | 2 gm | 1 gm | 1 gm | 1 gm | 1 gm |
| Ba(OH)2 | | | | 1 gm | | 2 gm | |
| Sr(OH)2 | | | | | 2 gm | | 4 gm |
| Na2Al2O3 | 4 gm to QL | 3 gm | 4 gm after slaking | | | | |
| CaCl2 | | | | | | | |
| Comments | very thick | very thick | Settled, thin. Added 4 g Al₂O₃Na₂O after slaking | think, but not settling | settled | thick | settled by slightly thick |
| % retained Sieve sizes | | | | | | | |
| +30 | 5% | 3% | 7% | 3% | 3% | 2% | 3% |
| +100 | 5% | 7% | 35% | 10% | 14% | 4% | 13% |
| +200 | 4% | 5% | 20% | 6% | 19% | 5% | 15% |
| −200 mesh | 87% | 85% | 38% | 81% | 65% | 89% | 70% |

TABLE 4

| Date | May 26, 2005 | May 25, 2005 | May 26, 2005 | May 25, 2005 | May 26, 2005 | May 27, 2005 | May 27, 2005 | May 31, 2005 | May 31, 2005 |
|---|---|---|---|---|---|---|---|---|---|
| | 1 | | 2 | | 5 | 5B | 5A | 10 (repeat of 6) | 11 |
| Description | 300 g DI H₂O + 100 g QL | 300 g DI H₂O + 100 g QL | 300 g DI H₂O + [100 g QL + 1 g Gypsum] | 300 g DI H₂O + 100 g QL | [300 g DI H₂O + 1 g Al₂O₃ Na₂O] + [100 g QL + 1 g Gypsum] | [300 g DI H₂O + 0.5 g Al₂O₃ Na₂O] + [100 g QL + 2 g Gypsum] | [300 g DI H₂O + 1 g Al₂O₃ Na₂O] + [100 g QL + 2 g Gypsum] | 300 g DI H₂O + [100 g QL + 2 g Gypsum + 1 g Al₂O₃ Na₂O] | 300 g DI H₂O + [100 g QL + 2 g Gypsum + 2 g Al₂O₃ Na₂O] |

TABLE 4-continued

|  | Control | | | | | | | | |
|---|---|---|---|---|---|---|---|---|---|
| Gypsum Additive |  | 1 gm | 1 gm | 1 gm | 1 gm | 2 gm | 2 gm | 2 gm | 2 gm |
| Ba(OH)2 |  |  |  |  |  |  |  |  |  |
| Sr(OH)2 |  |  |  |  |  |  |  |  |  |
| Na2Al2O3 |  |  |  | 0.8 | 1 gm | 0.5 gm | 1 gm | 1 gm to QL | 2 gm to QL |
| CaCl2 |  |  |  | 1 gm |  |  |  |  |  |
| Comments | non-settling | settled | settled | thick | thick | settled |  | thin | thick |
| % retained Sieve sizes |  |  |  |  |  |  |  |  |  |
| +30 | 2% | 8% | 5% | 3% | 4% | 7% | 3% | 4% | 3% |
| +100 | 8% | 47% | 27% | 10% | 7% | 25% | 10% | 19% | 5% |
| +200 | 9% | 16% | 21% | 7% | 4% | 19% | 8% | 32% | 5% |
| −200 mesh | 82% | 30% | 48% | 80% | 84% | 50% | 79% | 45% | 88% |

TABLE 5

| Description | {600 g DI $H_2O$} + 150 QL | {600 g DI $H_2O$ + 0.75 g $Na_2Al_2O_3$} + 150 QL | {600 g DI $H_2O$ + 0.75 g $Al(NO_3)_3$} + 150 QL | {600 g DI $H_2O$ + 0.75 g $C_4H_7AlO_5$} + 150 QL | {600 g DI $H_2O$ + 0.75 g $C_9H_{15}AlO_2$} + 150 QL |
|---|---|---|---|---|---|
| % S | 0.4% | 0.4% | 0.4% | 0.4% | 0.4% |
| Additive | none | sodium aluminate | aluminum nitrate | aluminum acetate | lactic acid aluminate |
| % additive | 0 | 0.5% | 0.5% | 0.5% | 0.5% |
| % retained sieve sizes |  |  |  |  |  |
| +30 | 10% | 0% | 0% | 0% | 0% |
| +100 | 29% | 0% | 2% | 5% | 5% |
| +200 | 4% | 5% | 5% | 5% | 5% |
| −200 mesh | 57% | 95% | 93% | 90% | 90% |
| settling rate | high | very low | low | low | low |

An invention has been provided with several advantages. The technology of eliminating soluble sulfate ion induced agglomeration of high sulfur quicklime during quicklime slaking has been proven to be very effective. The inventive method produces an environmentally benign and economically sensible sulfate precipitating agent. The result will be to open the potential of more widespread acceptance of high sulfur quicklime into a number of different markets.

While the invention has been shown in several of its forms, it is not thus limited but is susceptible to various changes and modifications without departing from the spirit thereof.

I claim:

1. A method of slaking high sulfate containing quicklime in a slaking operation to form fine particles of calcium hydroxide, the method comprising the steps of:
   providing a source of quicklime and a source of slaking water;
   slaking the quicklime with the slaking water to form calcium hydroxide particles;
   wherein a complexing agent is pre-mixed with the quicklime or with the slaking water before the slaking step, the complexing agent being effective to tie up available soluble sulfate ions present in the quicklime upon addition of the quicklime to the slaking water and thereby causing less agglomeration of the calcium hydroxide particles in the slaking operation as compared to the same process in which the complexing is added after the slaking step.

2. The method of claim 1, wherein the complexing agent is an aluminum ion donor.

3. The method of claim 2, wherein the complexing agent is selected from the group consisting of sodium aluminate, aluminum nitrate, aluminum acetate, and L-lactic acid aluminum salt.

4. The method of claim 1, wherein the complexing agent is mixed with the quicklime prior to combining the quicklime and the slaking water.

5. The method of claim 1, wherein the complexing agent is mixed with the slaking water and the slaking water is then combined with the quicklime.

6. A method of forming hydrated lime in a slaking operation, the hydrated lime having an acceptable sulfate content from a relatively high sulfate content quicklime feed, the method comprising the steps of:
   providing a source of ordinary limestone;
   calcining the limestone in a kiln using a relatively high sulfur content solid fuel as a combustion source for the kiln to obtain a quicklime;
   providing a source of slaking water for the obtained quicklime and slaking the quicklime with the slaking water to form calcium hydroxide particles;
   artificially inducing the formation of an additional reaction product, complex or precipitant by pre-mixing a complexing agent with the quicklime or with the slaking water before the slaking step, the complexing agent being effective to complex with available soluble sulfate ions present in the quicklime upon addition of the quicklime to the slaking water and thereby causing less agglomeration of the calcium hydroxide particles in the slaking operation as compared to the same process in which the complexing is added after the slaking step.

7. The method of claim 6, wherein the complexing agent is an aluminum ion donor.

8. The method of claim 7, wherein the complexing agent is selected from the group consisting of sodium aluminate, aluminum nitrate, aluminum acetate, and L-lactic acid aluminum salt.

9. The method of claim 6, wherein the complexing agent is mixed with the quicklime prior to combining the quicklime and the slaking water.

10. The method of claim 6, wherein the complexing agent is mixed with the slaking water and the slaking water is then combined with the quicklime.

* * * * *